(12) United States Patent
Preuss

(10) Patent No.: US 7,202,990 B2
(45) Date of Patent: Apr. 10, 2007

(54) METHOD AND DEVICE FOR LIGHT MODULATION BY MEANS OF A GRANULAR GAS

(75) Inventor: Sven Preuss, Heidelberg (DE)

(73) Assignee: Heidelberg Instruments Mikrotechnik GmbH, Heidelberg (DE)

( * ) Notice: Subject to any disclaimer, the term of this patent is extended or adjusted under 35 U.S.C. 154(b) by 0 days.

(21) Appl. No.: 10/501,621

(22) PCT Filed: Mar. 25, 2003

(86) PCT No.: PCT/EP03/03073

§ 371 (c)(1),
(2), (4) Date: Sep. 30, 2004

(87) PCT Pub. No.: WO03/081332

PCT Pub. Date: Oct. 2, 2003

(65) Prior Publication Data

US 2005/0024709 A1    Feb. 3, 2005

(30) Foreign Application Priority Data

Mar. 26, 2002    (DE)    ................... 102 13 731

(51) Int. Cl.
*G02B 26/00* (2006.01)
*G02B 26/08* (2006.01)
*G02F 1/29* (2006.01)

(52) U.S. Cl. ............ 359/296; 359/290; 359/291; 359/292; 359/298

(58) Field of Classification Search ........... 359/296, 359/290, 291, 292, 294, 295, 298
See application file for complete search history.

(56) References Cited

U.S. PATENT DOCUMENTS

| | | | | |
|---|---|---|---|---|
| 3,986,871 A | * | 10/1976 | Blades et al. | ............ 430/53 |
| 4,026,700 A | * | 5/1977 | Rasekhi | ............ 430/68 |
| 4,215,324 A | | 7/1980 | Abrams et al. | |
| 5,280,169 A | | 1/1994 | Adamo et al. | |
| 5,461,397 A | * | 10/1995 | Zhang et al. | ............ 345/102 |
| 5,855,753 A | * | 1/1999 | Trau et al. | ............ 204/484 |
| 6,407,763 B1 | * | 6/2002 | Yamaguchi et al. | ........ 347/112 |

FOREIGN PATENT DOCUMENTS

JP    2001-312225    11/2001

* cited by examiner

*Primary Examiner*—Alicia M. Harrington
*Assistant Examiner*—Brandi Thomas
(74) *Attorney, Agent, or Firm*—Jordan and Hamburg LLP

(57) ABSTRACT

The invention relates to a method and a device for light modulation, wherein the intensity of light can be altered by means of electrically chargeable or charged particles (5). The aim of the invention is to obtain light modulation in an economical, fast and reliably reproducible manner. According to the invention, a gas or vacuum is provided wherein the particles (5) can be displaced; a granular gas (6) is produced using said gas or vacuum between at least two electrodes (1, 2) in such a manner that electrically charged particles (5) in the electric field between the electrodes (1, 2) can be moved backwards and forth and the light which is to be modulated is guided through the granular gas (6) between the electrodes (1, 2).

19 Claims, 4 Drawing Sheets

METHOD AND DEVICE FOR LIGHT MODULATION BY MEANS OF A GRANULAR GAS

BACKGROUND OF THE INVENTION

The invention relates to a method for light modulation in accordance with the features cited in this description. The invention furthermore relates to an apparatus for performing the method.

Various techniques that each utilize various physical effects have been developed for modulating and switching light. The best known and most important methods are liquid crystals, such as liquid crystal displays (LCD) or ferroelectric liquid crystal displays (FLCD), micromirrors (individual and matrix), electrooptic and acoustooptic modulators (Kerr and Pockels cell, AOM), and electrophoretic displays. Charged particles in a suspension are disposed in electrophoretic displays, that is, they float in an electrically insulating liquid.

BRIEF SUMMARY OF THE INVENTION

The object of the invention is to suggest a method and an apparatus in order to be able to perform light modulation in a simpler manner and with less structural complexity. The method should enable rapid and/or reliable reproducible modulation of the light and should be adaptable to various employment conditions and applications with no problems. The method should be realizable by means of the apparatus with low complexity and few components. Furthermore, the apparatus should have a low structural volume and should enable simple integration and adaptation to available systems. In addition, the method/apparatus should improve the switching speed of the light modulation.

This object is achieved in terms of the method in accordance with the features of the description and furthermore in terms of the apparatus also in accordance with the features of the description.

With the suggested method and the suggested apparatus, light of any desired source and wavelength, in particular also the coherent parallel light of a laser, can be modulated, that is, can be altered in its intensity. For this, the light is introduced into the equipment or apparatus described here and characterized in the following also as a "modulation cell". This introduction can require a different optical system depending on light source and application. In accordance with the method, charged particles move in a gas or even in the vacuum and generate a so-called "granular gas". Such a granular gas, which is largely a homogeneous cloud made of powder particles (mist) can be produced in a variety of ways, for instance by vibrating a powder, by blowing a gas into a powder. In accordance with the invention, the granular gas is produced by external electrostatic forces that act on the electrically charged powder particles. The light intensity is modulated inside a cell containing an electrode by the controlled granular gas, the cell preferably being sealed to the exterior. Light exiting the cell is displaced through an optical system depending on application. The light modulation, in particular of the coherent parallel light of a laser, occurs inventively by means of the controlled granular gas.

Figure 4:
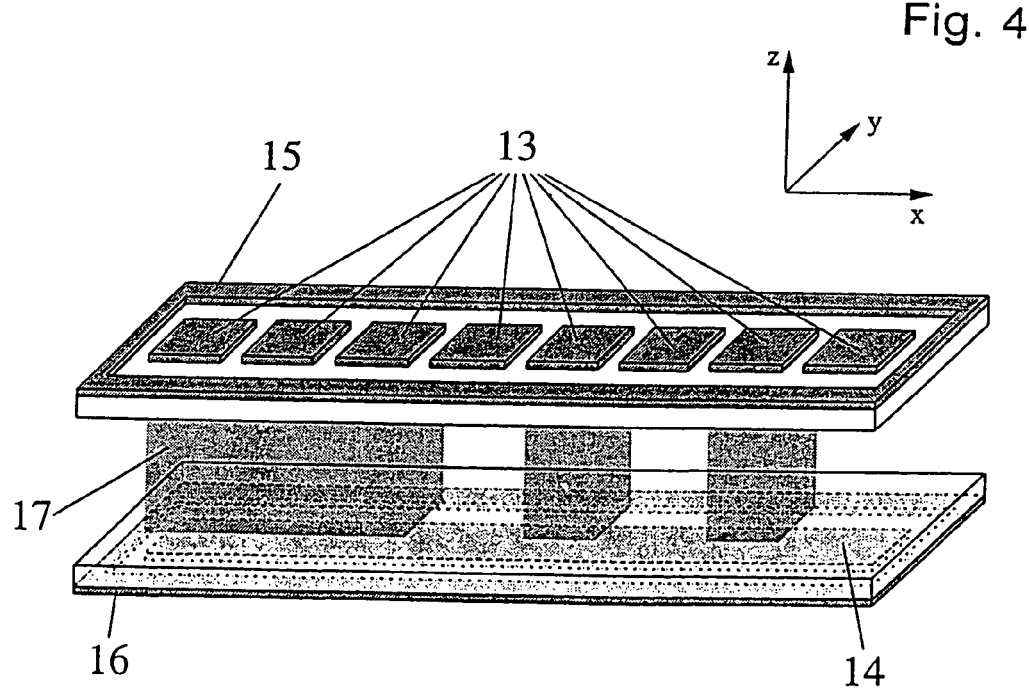

Depending on the precise structure of the modulation cell, a single light beam, parts thereof, or even a plurality of light beams can be modulated in parallel. Light that is radiated into the modulation cell is characterized as a light beam, and can be a laser beam as well as the collimated and/or focussed light from a different desired light source. Using this modulation of the light, the equipment can be used for instance as a variable, rapidly switchable gray filter that reduces an entire light beam or parts thereof. In particular it is also possible to divide an extended light beam into pixels and to modulate these pixels individually (see also FIG. 4), this realizing a so-called "spatial light modulator" (SLM).

DETAILED DESCRIPTION OF THE INVENTION

The invention is described in the following in greater detail using the particular exemplary embodiments illustrated in the drawings without this creating a restriction thereto.

Figure 1:
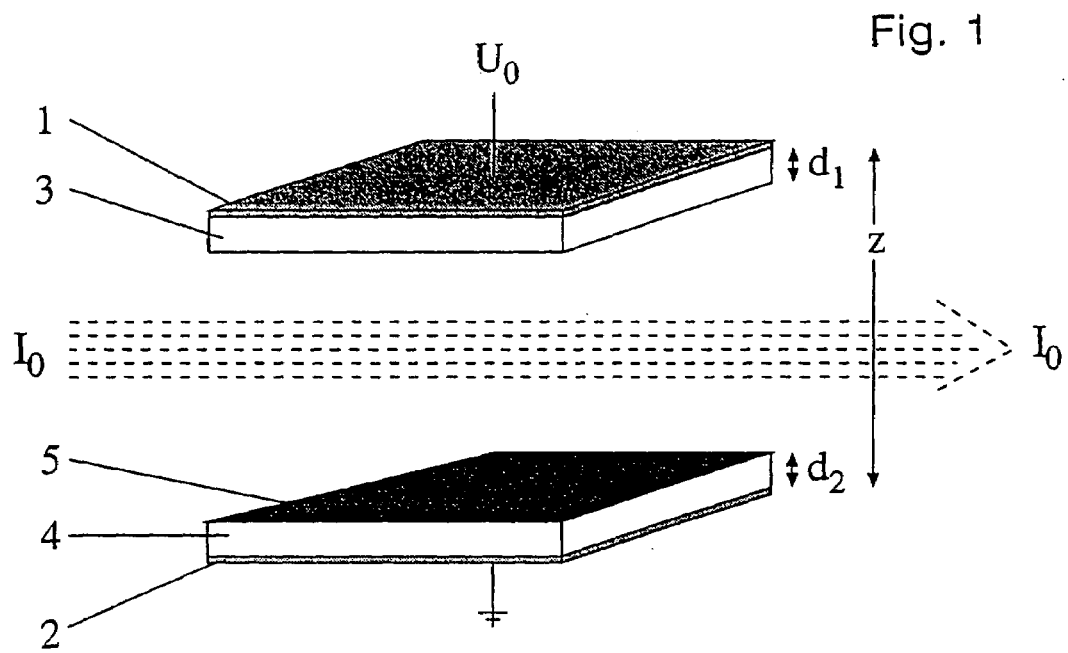

As can be seen from FIG. 1, disposed in the basic modulation cell are two electrodes 1, 2 at a distance z from one another. Disposed in the intermediate space between the two electrodes 1, 2 is an electrically charged powder 5 and a desired dense gas or vacuum. Depending on the type of powder 5, the electrodes 1, 2 are coated with an optional electrically insulating layer 3, 4, with the thickness $d_1$ and/or $d_2$, as will be described in greater detail in the following. The powder particles adhere to the insulating layers 3, 4 when there is an applied and/or largely constant voltage $U_0$ between the electrodes 1, 2. The light to be modulated, with an intensity $I_0$, enters the cell laterally and traverses it unimpeded.

Figure 2:
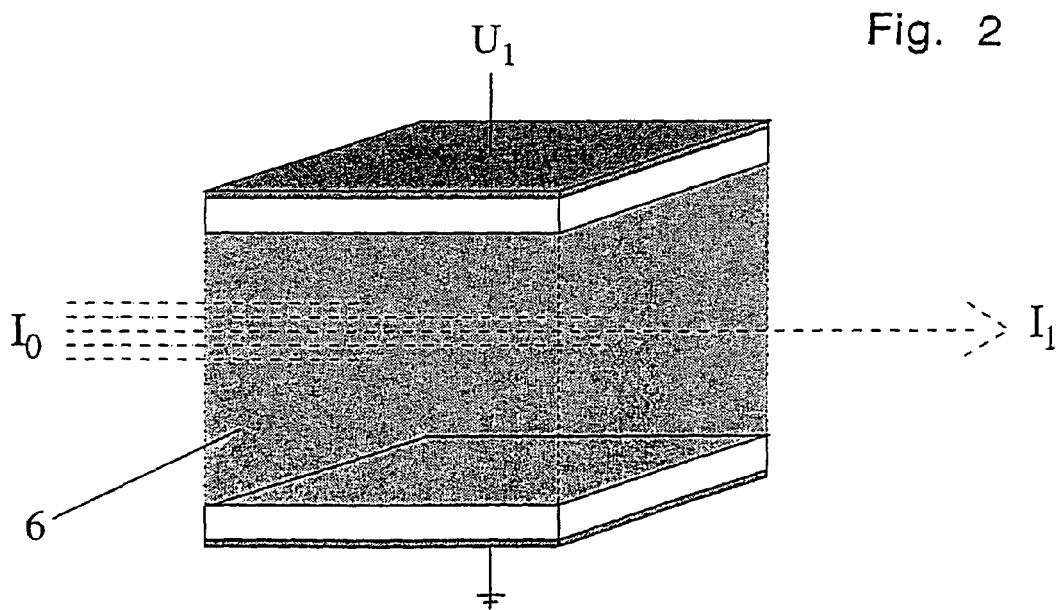

If a temporally varying voltage $U_1$ is applied in accordance with FIG. 2 between the two electrodes, an electrical field ($E=U_1/z$) occurs, which puts the charged particles in motion when the field strength is sufficient and causes them to move in the direction of the other electrode. The particles do not move synchronously, since they adhere to the electrodes using a different force, that is, the powder particles begin to move at different points in time. At the appropriate frequency of the voltage $U_1$, the particles move back and forth between the electrodes, interacting with one another, and thus produce a gas 6. Because of the electrical field, the force $F=(U_1^* Q)/z$ acts on the particles and the particles experience acceleration $a=F/m$ because of this force, whereby Q is the charge and m is the mass of one powder particle. There is an upper limit for the frequency of the voltage $U_1$, above which no homogeneous granular gas can be produced between the electrodes since the powder particles are too sluggish and cover only a fraction of the segment z in the rapidly alternating electrical field. This limit frequency depends on the distance between electrodes z and on the mass and charge of the powder particles. In accordance with the invention, the voltage $U_1$ is provided with a frequency that is less than the limit frequency- The lower limit for the frequency is the frequency above which the powder particles can be moved back and forth from the one electrode to the other electrode depending in particular on the aforesaid parameters.

If a granular gas is produced, the entering light is absorbed/diffused by the powder particles and only a fraction $I_1<I_0$ of the entering intensity $I_0$ can traverse the cell or apparatus. The ratio of $I_1$ to $I_0$ depends on the length of the segment that the light travels through the granular gas, as well as on the density and diffusability/absorption ability of the granular gas. The extinction coefficient of the granular gas and the speed with which it can be produced from the resting powder particles (switching speed) depends in particular on the strength and the temporal course of the applied voltage as well as on the material, charge, and size of the individual powder particles. The switching speed increases as mass of the individual particles decreases and the electrical charge of the individual particles increases, that is, as the quotient of charge and mass Q/m increases. Likewise, the switching speed increases with the strength of the electrical field between the electrodes, that is, as voltage $U_1$ increases or as distance z decreases.

Due to the electrical repulsive forces, the charged powder attempts to achieve the greatest possible distance between the individual powder particles and to extend across the limits of the cell. However, since particles that are not disposed between the electrodes cannot be moved any more, this extension must be prevented. This occurs using the selection of the electrical field, which is formed such that it prevents this extension.

One electrical field that limits the powder to the space between the electrodes can be realized by dividing the electrodes 1, 2 in accordance with FIG. 2 into a plurality of individual electrodes that can be occupied with a voltage independent of one another and are characterized in the following as control electrodes and limiting electrodes. The control electrodes produce (turn on and off) the granular gas, and the limiting electrodes produce a potential barrier and prevent the powder particles from leaving the modulation cell. There are an incalculable number of options for varying the shape, number, and position of the control and limiting electrodes. The precise geometric arrangement depends on the application and the required light modulation. In particular the geometry of the upper electrode 1 must not be identical to the geometry of the lower electrode 2.

Figure 3:
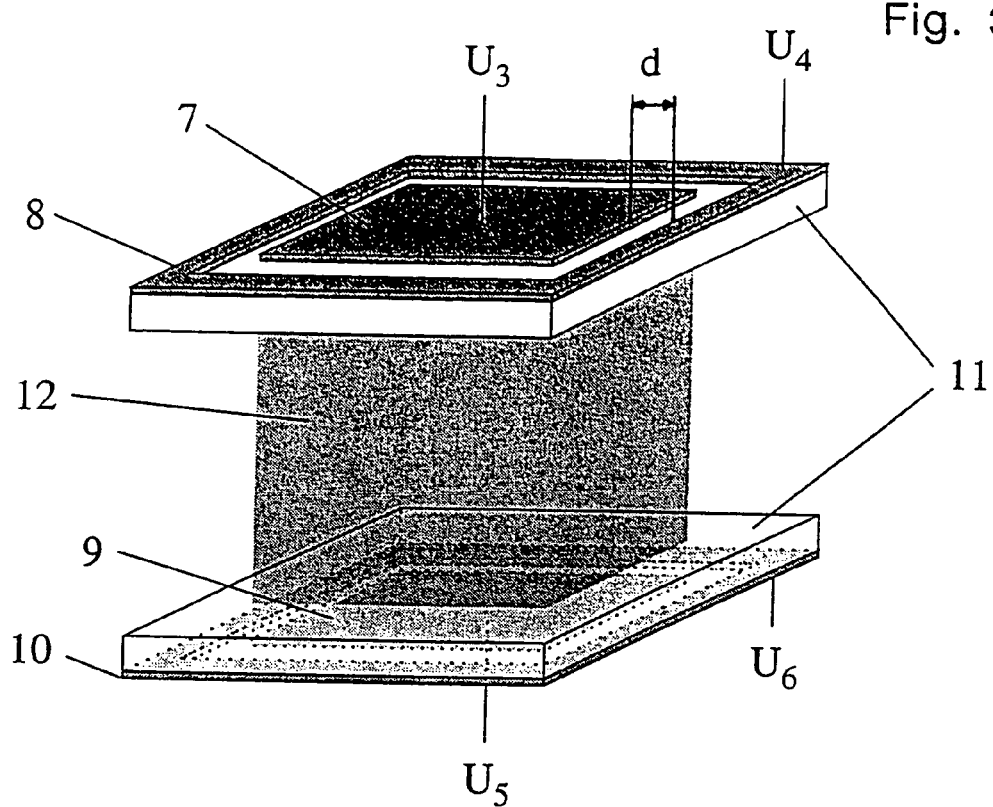

FIG. 3 illustrates as an example the simplest cell of this type in which the upper and lower electrodes each comprise one control and one limiting electrode, which in this case are rectangular, however, as has been discussed, can have any desired shape (polygon, ellipse) depending on application. The electrodes 7 and 8/9 and 10 are separated by a distance d and in this case are all covered by an electrically insulating layer 11. The control electrodes 7, 9 produce the granular gas and the external limiting electrodes 8, 10 ensure that the powder particles 12 cannot leave the modulation cell. For instance, if the powder has a positive charge, this is achieved in that the limiting electrodes 8, 10 are switched positively compared to the control electrodes 7, 9, that is $U_4 > U_3$ and $U_6 > U_5$. Thus, using appropriate selection of the voltages $U_{3-6}$, which vary temporally and from one another, a granular gas 12 is produced that is largely limited to the space between the control electrodes 7,9.

Another example is the simplest form of an SLM, tat is, a modulation field cell that comprises a series of individual pixels that can modulate the parts of a light beam that are independent of one another. In the framework of the invention, a desired or defined number of cells as in FIG. 3 is placed and/or provided adjacent to one another. Furthermore, an SLM can be inventively realized as in FIG. 4. In this case the cell comprises eight pixels (theoretically, but can also be as many as desired) that can be turned on and off individually via the first control electrodes 13. The second, lower electrode 14 in accordance with FIG. 4 in this case is a continuous surface, but depending on application can also be divided into a plurality of control electrodes or can be embodied geometrically identical to the upper control elcetrode. The limiting electrodes 15, 16 again confine the granular gas 17 to the cell. Each of these elcetrodes can be occupied with a voltage independent of one another, whereby the granular gas 17 in each pixel can be switched. Because of this, the light, which traverses the cell in the Y direction, can be modulated independently in each individual pixel. Depending on the application and desired light modulation, several or all of the electrodes can also be divided in the Y direction in such an SLM. Likewise, the distance of the electrodes from one another and their geometrical shape depends on the desired light modulation. As a result of the partial areas therefore provided independent of one another in the X direction, or the light traversing, and in which granular gas is selectably present or not present, the path of the light penetrating the granular gas partial areas is predefinable and/or modifiable. Thus the degree of modulation is provided in a defined manner in accordance with the invention.

Figure 5:
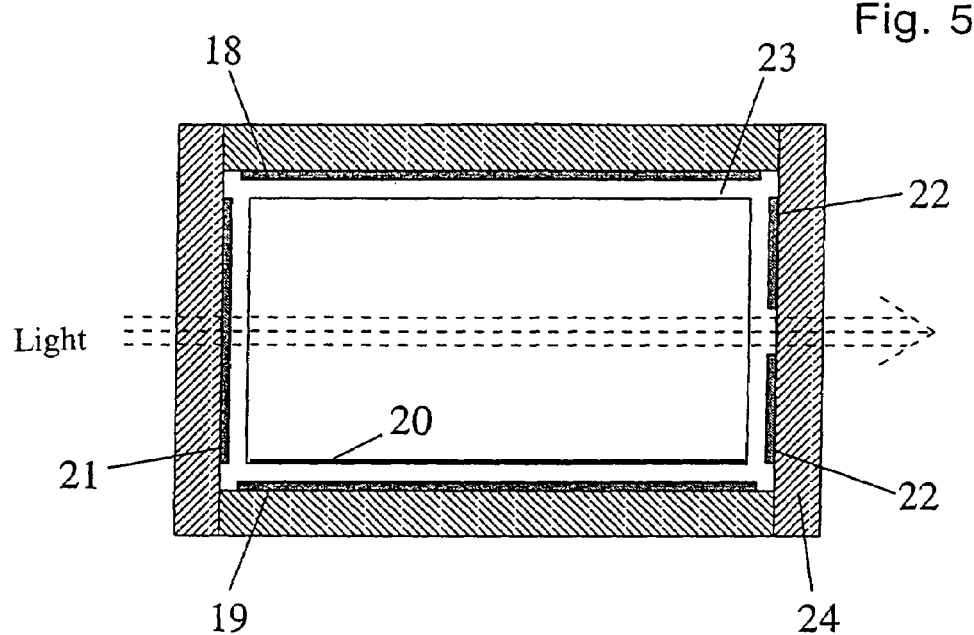

In the previous examples the electrodes were limited to two planes in the vertical direction, but this is not necessarily so. For instance, a completely encapsulated modulation cell can be built in which the limiting electrodes are oriented vertically rather than horizontally. FIG. 5 illustrates a section through such a cell. The control electrodes 18, 19 produce the granular gas from the powder 20, and the limiting electrodes 21, 22 in this case prevent the powder particles from adhering to the walls of the cell and keep the powder between the control electrodes. All of the electrodes are coated with an electrically insulating layer 23. Since the light to be modulated is also directed through the intermediate space of the controlling electrodes in an encapsulated cell, the limiting electrodes must either be transparent 21, e.g., indium tin oxide (ITO) or must be structured 22 such that the light is not blocked by them. Likewise, the insulating layer 23 and the substrate 24 on which the limiting electrode is situated in this case must comprise a transparent material. For encapsulated cells, as well, the number and geometric shape and arrangement of the electrodes depends on the application, so that SLMs can also be realized.

Naturally different or identical modulation cells can be switched in series or parallel in order to obtain specific modulation results; in particular a two-dimensional SLM can be realized using parallel switching.

The dimensions of the modulation cell and the powder particles depend on the application, in particular the switching speed that one wants to attain. The smaller the dimensions, the faster the granular gas can be switched and thus the light can be modulated and the smaller the required voltage is for producing the granular gas. Typical distances between the electrodes z, in Illustration 1, are in the range of 1 mm to 0.1 mm, and typical voltages for producing the granular gas are between 1000 V and 50 V. The geometric dimensions of the control and limiting electrodes can be in the range of micrometers but also centimeters and depend on the desired light modulation.

Figure 6:
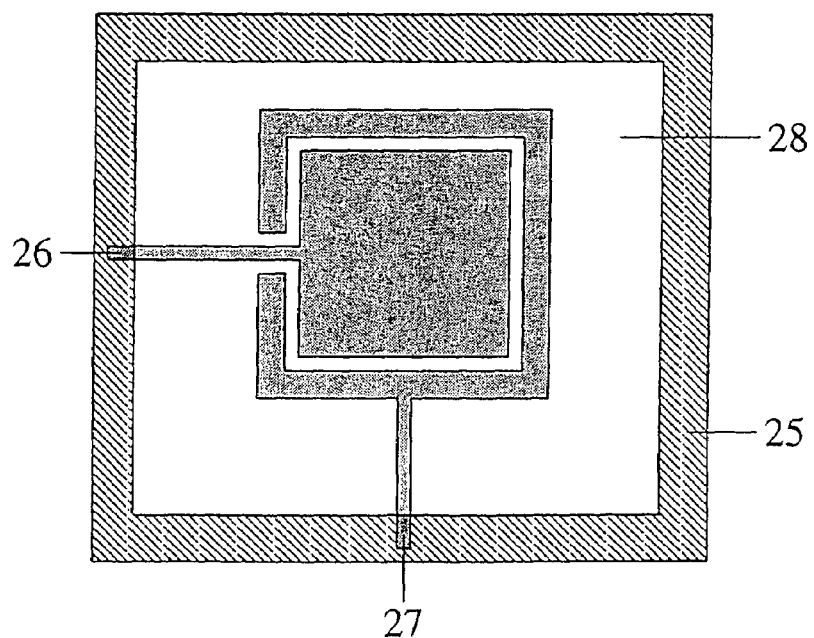

The modulation cells can be easily produced for instance using photolithography processes that are particularly suitable, even for marking small structures. In accordance with FIG. 6, the structure of the electrodes is produced on a substrate, in particular a metal-coated glass plate 25. FIG. 6 illustrates one preferred option for realizing the modulation cell in accordance with FIG. 3. The control electrode 26 (7, 9 in FIG. 3) and the limiting electrode 27 (8, 10 in FIG. 3) can be supplied with a voltage separately. The optional thin insulating layer 28 (11 in FIG. 3) can be applied using sputtering, vapor deposition, or in the form of dissolved polymers using spin-coating. Two such glass plates 5 are then separated by a spacer, and, after the charged powder is added, can be used as a modulation cell.

The material the powder between the control electrodes comprises is in principle any material—it can be a conducting, semi-conducting, or non-conducting material. The sole condition is that the individual particles for producing the granular gas must carry an excess electrical charge, since otherwise they will not be able to be moved. However, the selection of the powder material and the particle size is essential for the properties of the modulation cell, in particular with respect to the extinction coefficients at a certain wavelength and the speed at which the granular gas can be turned on or off.

The electrical charging of the powder can occur prior to introducing the powder into the modulation cell, but under certain conditions it can also occur directly in the cell. If the powder comprises a poorly conductive or non-conductive material, one of the electrodes can be uninsulated ($d_1$ or $d_2$ equals zero in FIG. 1), and the powder can also be charged directly via one of the control electrodes. Charging of poorly conductive powder takes a long time (minutes to hours), but the powder particles also hold their charge for a long time and release it only slowly.

Figure 7:
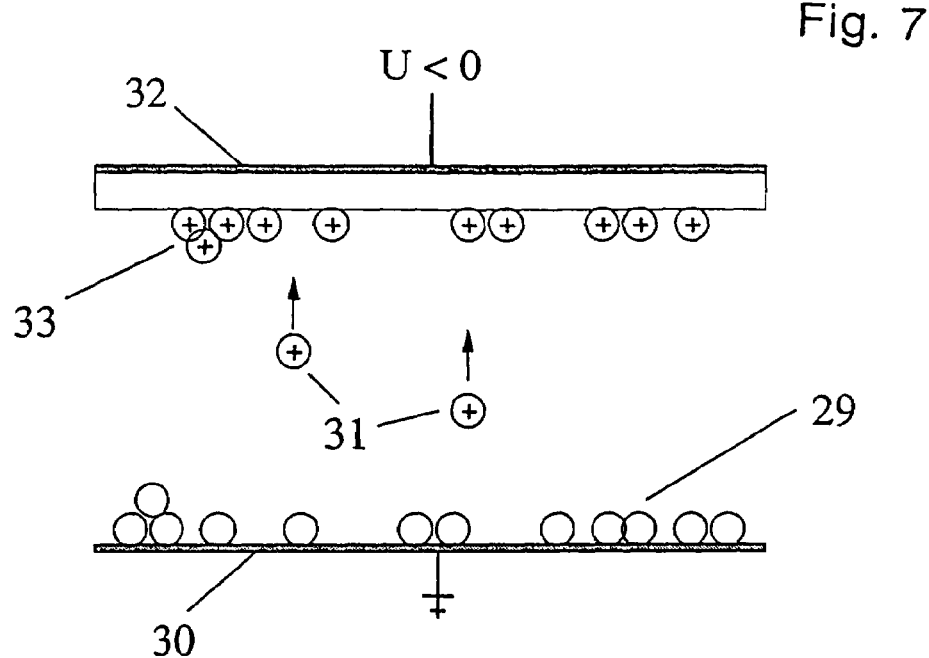

FIG. 7 illustrates this charging schematically. The powder particles 29 are charged positively in this example on the uninsulated control electrode 30 by the voltage U, and as soon as they have received a sufficient charge they move in the electrical field 31 to the insulated electrode 32 and adhere there 33. Once the powder has been charged, a varying voltage can be applied and a granular gas can be produced. Since the powder is poorly conductive, it does not reverse the charge when it comes into contact with the uninsulated electrode, but rather retains the positive charge.

This method does not work with a conductive powder material. Although it could be charged more rapidly, the granular gas would comprise a mixture of positively and negatively charged particles, since, when it comes into contact with the uninsulated electrode, the powder immediately assumes the polarity that the electrode possesses at that moment. A granular gas that contains both polarities, however, cannot be controlled with no further measures. In addition, with a conductive powder and non-insulated electrodes, there is the risk of a disruptive electrical discharge, which would destroy the modulation cell.

Figure 8:
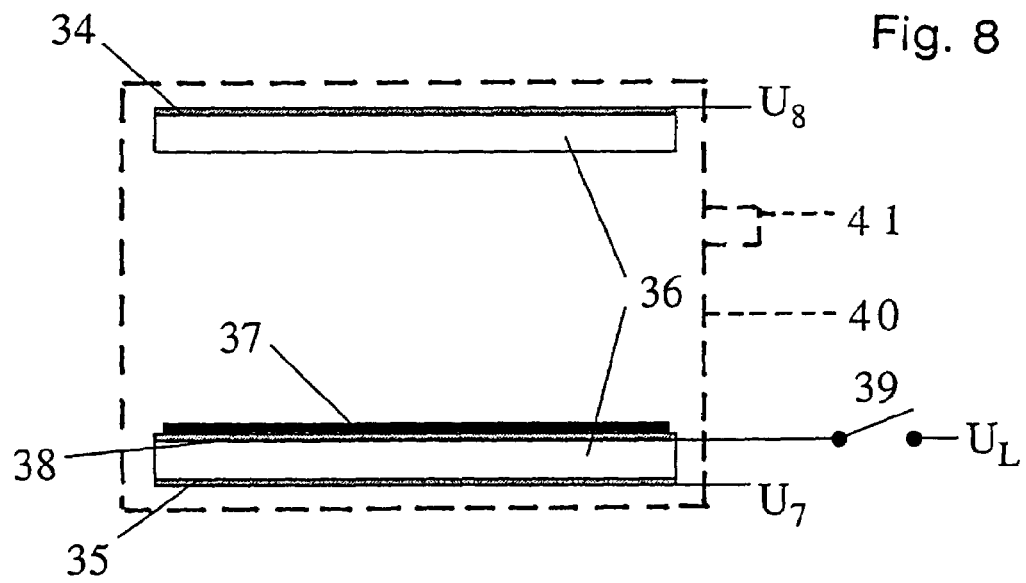

However, using an additional charging electrode in the modulation cell, charging is possible, even later, both for conductive and non-conductive powder. FIG. 8 illustrates the section through a modulation cell with the two control electrodes 34, 35, insulating layers 36, powder 37, and with additional charging electrode 38. By applying the voltage $U_L$ to the charging electrode 38 and a voltage $U_7$ and $U_8$ matched thereto to the electrodes, an electrical charge is transmitted to the charging electrode and the powder. After charging, the charging electrode is insulated from the voltage source, which can occur for instance using a relay 39, so that the powder cannot be discharged again. Then the cell can be used for light modulation. The charge of the powder particles can be modified or refreshed using the charging electrode 38.

A housing 40 for the apparatus is indicated schematically by means of the dashed line. In accordance with the invention, such a housing is also provided for the other exemplary embodiments. The housing surrounds the components described in the foregoing, whereby the housing has passages (not described in greater detail here) for electrical connecting lines for the electrodes. The housing 40 is embodied air-tight, preferably vacuum-tight, in order to preclude disadvantageous interactions with the environment, for instance in order to prevent the gas or the granular gas from escaping or to maintain stability for producing the granular gas for a long time. Furthermore, the housing 40 can have a connection 41 for supplying or regenerating the gas provided for producing the granular gas or for producing or maintaining the aforesaid vacuum.

The housing 40 is light-permeable at least in the areas provided for the passage of light.

The invention relates to a method and an apparatus for modulating light by a controlled granular gas. This granular gas occurs from charged powder particles and is produced and controlled within a modulation cell by electrostatic forces. The forces are exerted by a number of electrodes to each of which a temporally varied voltage is applied separately. The so-called control electrodes produce the granular gas and the limiting electrodes prevent the powder from escaping from the modulation cell. Using the geometric arrangement of the electrodes, it is possible to divide the cell into individual pixels that can be switched independent of one another. The spatial dimensions, as well as the number and geometrical arrangement of the electrodes, depends on the application and the desired light modulation. The electrical charge of the powder particles occurs prior to introducing the powder into the modulation cell, or, depending on the material of the powder, using an uninsulated control electrode or using an additional non-insulated electrode.

REFERENCE SYMBOLS 1, 2 Electrode
3, 4 Electrically insulating layer
5 Electrically charged powder
6 Granular gas
7,9 Control electrode
8,10 Limiting electrode
12 Powder particle
13 Upper or first control electrode/control electrodes
14 Lower or second control electrode/control electrodes
15, 16 Limiting electrode
17 Granular gas
18, 19 Control electrode
20 Electrically charged powder
21, 22 Limiting electrode
23 Insulating layer
24 Substrate
25 Glass plate
26 Control electrode
27 Limiting electrode
28 Insulating layer
29 Powder particles
30 Uninsulated control electrode
31 Electrical field
32 Insulated electrode
33 Charged particle
34, 35 Control electrode
36 Insulating layer
37 Powder
38 Additional charging electrode
39 Relay
40 Housing
41 Connection

The invention claimed is:
1. Method for light modulation, whereby intensity of the light is modified by means of electrically chargeable or charged particles, wherein
   a gas or vacuum is provided in which said particles are movable,
   a granular gas is produced with said gas or vacuum between at least two control electrodes such that due to a temporally varied voltage applied to one of said electrodes said electrically charged particles present in an electrical field between said electrodes are moved back and forth, the light for modulation is conducted through said granular gas between said electrodes, and said light is illuminated into said granular gas in a direction parallel to surfaces of said electrodes which face said granular gas.

2. Method in accordance with claim 1, wherein said light modulation is performed by changing said voltage applied to said electrodes between a lower limit of voltage at which said particles are largely not moved or adhere in the area of one of said electrodes and an upper limit of voltage up to which said granular gas can be produced.

3. Method in accordance with claim 1 or 2, wherein light modulation is performed depending on the frequency and/or amplitude of said voltage applied to said electrodes.

4. Method for light modulation, whereby intensity of the light is modified by means of electrically chargeable or charged particles, wherein
a gas or vacuum is provided in which said particles are movable,
a granular gas is produced with said gas or vacuum between at least two control electrodes such that due to a temporally varied voltage applied to one of said control electrodes said electrically charged particles present in an electrical field between said control electrodes are moved back and forth,
the light for modulation is conducted through said granular gas between said control electrodes,
said control electrodes provide an area for forming said granular gas,
limiting electrodes are provided which limit said area for forming said granular gas from an exterior, and
a voltage is applied to said limiting electrodes and/or by means of said limiting electrodes an electrical field completely surrounding said granular gas is produced such that said electrically charged particles and/or said granular gas are kept in an area between said control electrodes.

5. Method in accordance with claim 1 or 2, wherein by means of a predetermined number of control electrodes, parts of said light beam entering into areas allocated to said control electrodes are modulated independent of one another.

6. Apparatus for light modulation, containing electrically chargeable or charged particles that are movable between at least two control electrodes by means of which the intensity of entering light can be modified, wherein provided is a modulation cell that is closed air-tight or vacuum-tight to an exterior and in which a gas or vacuum is present at least between said control electrodes, and a distance between said control electrodes is provided such that by applying a temporally varied voltage in an electrical field between said control electrodes a granular gas is present made of the electrically charged particles and the gas or vacuums and the light to be modulated travels into an area between said control electrodes, wherein arranged at a predetermined distance laterally to said control electrodes between which said granular gas can form are limiting electrodes to which a voltage is applicable such that said particles and/or said granular gas is kept in the modulation cell formed by means of said control electrodes.

7. Apparatus for light modulation, containing electrically chargeable or charged particles that are movable between at least two control electrodes by means of which the intensity of the entering light can be modified, wherein provided is a modulation cell that is closed air-tight or vacuum-tight to an exterior and in which a gas or vacuum is present at least between said control electrodes, and a distance between said control electrodes is provided such that by applying a temporally varied voltage in an electrical field between said control electrodes a granular gas is present made of the electrically charged particles and the gas or vacuums, and the light to be modulated travels into an area between said control electrodes, wherein limiting electrodes are arranged at a predetermined angle to said control electrodes and/or said limiting electrodes laterally limit an area of the granular gas and/or said limiting electrodes are light-permeable.

8. Apparatus in accordance with claim 7, wherein at least one of said control electrodes is coated with an electrically insulating layer on a side facing the area of said granular gas.

9. Apparatus in accordance with claim 8, wherein each of said control electrodes is coated with an electrically insulating layer on the side facing the area of said granular gas.

10. Method in accordance with claim 4, wherein said light modulation is performed by changing said voltage applied to said control electrodes between a lower limit of voltage at which said particles are largely not moved or adhere in the area of one of said control electrodes and an upper limit of voltage up to which said granular gas can be produced.

11. Apparatus in accordance with claim 6, wherein at least one of said control electrodes has an insulating layer on a side thereof facing another one of said control electrodes.

12. Apparatus in accordance with claim 7, wherein at least one of said control electrodes has an insulating layer on a side thereof facing another one of said control electrodes.

13. The method according to claim 1, wherein said light is illuminated into said granular gas with one intensity and said light exits said granular gas with a different intensity.

14. The method according to claim 1, wherein said light is illuminated into said granular gas with one intensity and said light exits said granular gas with a lower intensity.

15. The method according to claim 1, wherein at least some of said electrodes face each other and are separated by a distance of 0.1 mm to 1 mm.

16. The method according to claim 1, wherein said voltage is between 50 V and 1000 V.

17. The method according to claim 1, wherein said voltage is applied after said chargeable particles have been charged.

18. The method according to claim 1, further comprising charging a powder containing said particles with a charging electrode and insulating said charging electrode from a voltage source after said powder has been charged.

19. The method according to claim 1, wherein said light is modulated during the application of said temporally varied voltage.

* * * * *